Figure 1:
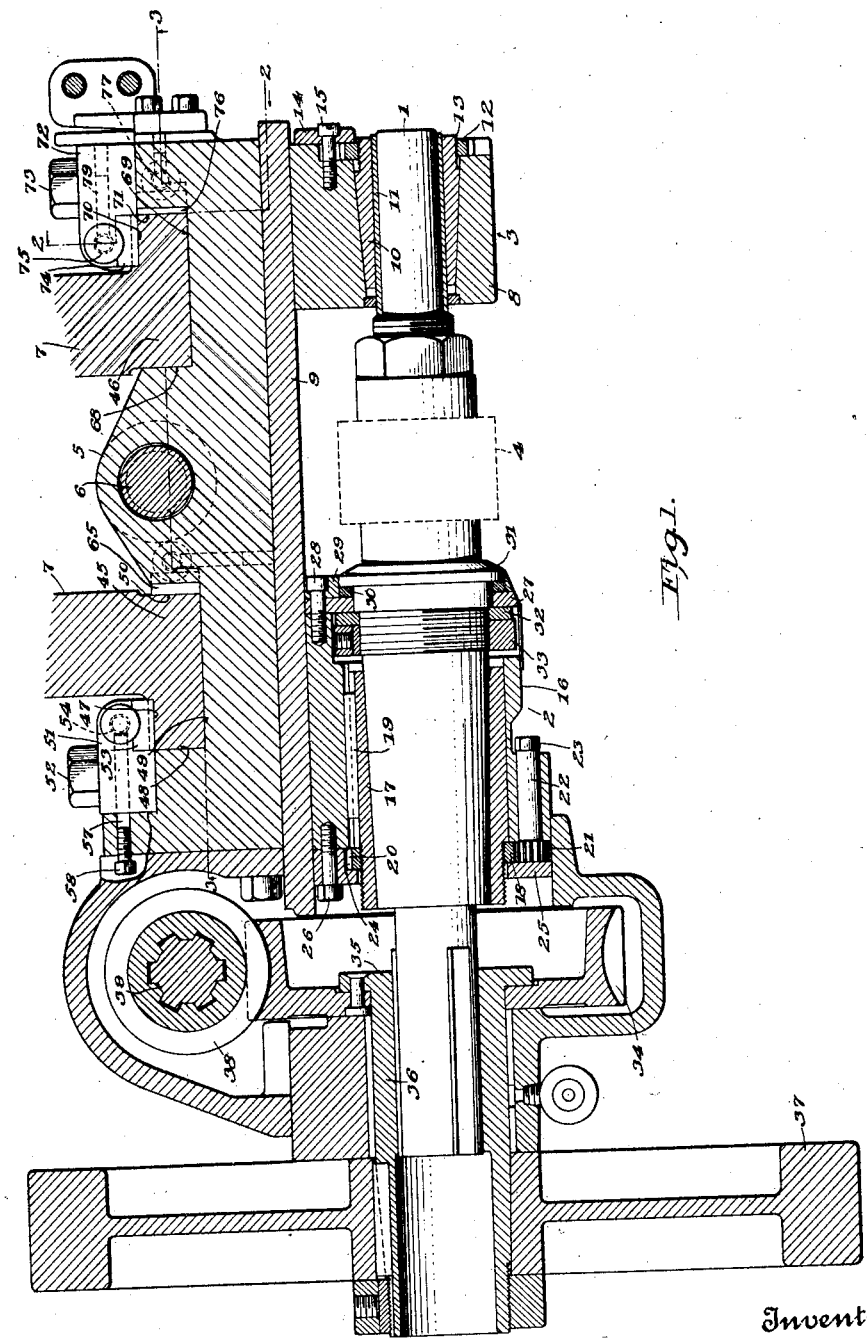

Oct. 30, 1928.

W. F. ZIMMERMANN 1,689,614

SPINDLE CARRIAGE GUIDE AND ADJUSTMENT

Filed June 30, 1925　　2 Sheets-Sheet 1

Inventor
William F. Zimmermann
By Attorney
Albert F. Nathan

Oct. 30, 1928.
W. F. ZIMMERMANN
1,689,614
SPINDLE CARRIAGE GUIDE AND ADJUSTMENT
Filed June 30, 1925 2 Sheets-Sheet 2
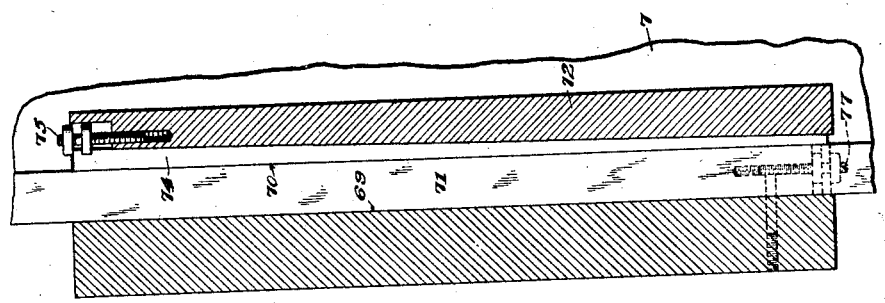
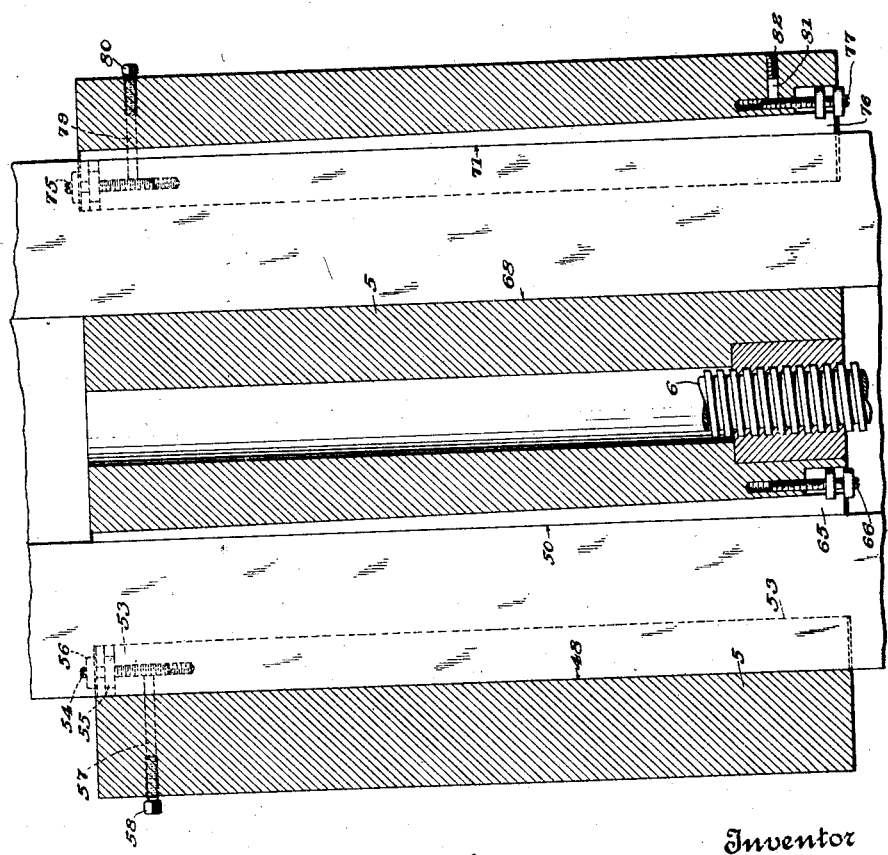
Inventor
William F. Zimmermann
By Attorney
Albert F. Nathan Patented Oct. 30, 1928.

1,689,614

UNITED STATES PATENT OFFICE.

WILLIAM F. ZIMMERMANN, OF MAPLEWOOD, NEW JERSEY, ASSIGNOR TO GOULD & EBERHARDT, OF NEWARK, NEW JERSEY, A CORPORATION OF NEW JERSEY.

SPINDLE-CARRIAGE GUIDE AND ADJUSTMENT.

Application filed June 30, 1925. Serial No. 40,543.

My invention is concerned with guiding means for carriages on machines and is particularly concerned with the guiding means and the adjustments thereof for the cutter-spindle carriage on hobbing machines.

In hobbing machines, a work carrying table is rotated in timed relation to a rotating hob spindle. The hob or cutter spindle is mounted on a carriage which is movable linearly with respect to the work carrying table. The linear movement of the hob spindle carriage is effected in timed relation to the rotation of the hob and of the work table. The linear feeding movement of the carriage must be effected with precision in gear hobbing machines in order to insure the cutting of substantially correct gear wheels. The hob carriage, in order to effect a uniform linear movement, must be provided with accurately formed guide ways and must be accurately fitted to the guide ways. Any play or looseness between the carriage and the guide members will show up as imperfections in the gears being hobbed.

One of the chief objects of my invention is to provide guiding means for the hob carriage in a hobbing machine that shall insure an even and a correct feeding movement of the hob carriage with respect to the work carrying table. The guide members are so constructed as to provide adequate guiding surfaces and to distribute the twisting tendency produced by a hob carriage during a hobbing operation. Moreover my invention provides means for taking care of the wear between each of the guide surfaces on the guide members and the carriage and for adjusting the relation between the guiding surfaces on the carriage and on the guide members.

In some prior constructions a V-shaped guide member has been used with a rectangular guide member and also two V-shaped guide members have been used for guiding the movement of a carriage. In each of the above constructions no means was provided for effecting adjustments in accordance with the wear on the guide surfaces. Moreover, no adjustable means is provided for insuring a snug sliding fit at all times between the carriage and the guide members. In the first construction above mentioned, wherein a rectangular guide member is combined with a V-shaped guide member, it will be noted the rectangular guide member is compelled to withstand all the twisting action of the carriage. Accordingly it is apparent that one part of the machine frame is subjected to an abnormal strain by reason of being compelled to withstand all the twisting tendency of the carriage.

In the second construction above mentioned, wherein two V-shaped guide members are provided for guiding the cutter carriage, the twisting action of the carriage tends to produce a separating of the guiding surfaces. Such an action tends to move the guide surfaces on the carriage away from the guide surfaces on the frame of the machine.

In a hobbing machine provided with a guide means constructed in accordance with my invention, two rectangularly shaped guide members in the nature of T-shaped rail walls are provided for engaging the carriage which is E-shaped to provide a portion nesting between the rail-walls. Each of the rectangular guide members comprises a complete narrow guide and moreover each rectangular guide member opposes the twisting tendency of the carriage. Adjustable wedge members are associated with each guide member to insure a snug sliding fit between each of the four surfaces on each guide member and the carriage. Bolts are provided for operating each wedge member to obtain a good sliding fit.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Figure 1 is a sectional view through the hob spindle and the hob carriage of a hobbing machine having guiding means constructed in accordance with my invention. Fig. 2 is a sectional view along the line 2—2 of Fig. 1. Fig. 3 is a sectional view along the line 3—3 of Fig. 1.

Referring to the drawings and particularly to Fig. 1, a hob spindle 1 is shown mounted in bearings 2 and 3. Intermediate the two bearings 2 and 3 is mounted a suitable hob 4. The two bearings 2 and 3 are supported upon a hob carriage 5 which is supported on and raised and lowered by means of a vertical screw shaft 6. The carriage is guided by means of guides formed on a stanchion 7 which will be described in detail later.

The bearing 3 comprises a frame 8 which is supported on a plate 9. The plate 9 is supported on the carriage 5. The frame 8 carries a bronze bushing 10 which has a conical fit with the frame 8 and a cylindrical fit with a hardened steel bushing 11 secured to the spindle 1. A nut 12, which is fitted to threads 13 on the bronze bushing 10, is provided for adjusting the position of the bushing in the bearing frame. A plate 14, which is held in position by means of a screw 15, is provided for engaging the nut 12.

The bearing 2 comprises a frame 16 which is suitably secured to the plate 9 on the carriage 5. The frame 16 carries a bronze bushing 17 which directly supports the spindle 1. The bushing 17 effects a cylindrical fit with the bearing frame 16 and a conical fit with the spindle 1, as shown in Fig. 1 of the drawings. A nut 18, which has a threaded connection with the bronze bushing 17, is provided for adjusting the longitudinal position of the bushing. A suitable key member 19 is provided for preventing rotation of the bushing 17 with the spindle 1. Suitable gear teeth 20 are formed on the outside of the nut 18 for engaging the teeth on a pinion 21 secured to a shaft 22. The shaft 22 is operated by a squared head 23 for adjusting the nut 18. The nut 18 is rotatably mounted in a recess 24 formed in the bearing frame and is held in position by means of a retaining plate 25 which in turn is secured in position by means of a bolt 26.

A hardened steel plate 27 is secured to one end of the bearing frame 16 by means of a screw 28 and a dust collar 29 is held in position by the same screw 28. A washer 30, which is preferably composed of bronze, is interposed between the head 31 of the cutter spindle 1 and the hardened steel plate 27. Another washer 32, which is preferably composed of bronze, is located between the hardened plate 27 and an adjusting nut 33. The washer 32 is held against rotation with respect to the spindle in any suitable manner and thus insuring against a bearing surface between it and the adjusting nut. The adjusting nut is threadably connected to the spindle 1 and serves to prevent longitudinal movement of the spindle with respect to the bearing 2. For a more complete description of the construction of the two bearings 2 and 3 reference may be had to my copending application Serial No. 15,218 filed March 13, 1925.

The hob spindle 1 is rotated by means of a worm wheel 34 which is mounted on the spindle by means of a steel plate 35 having a hub portion 36. The cutter spindle 1 has a splined connection with the hub portion 36, as indicated in Fig. 1 of the drawings. A balance wheel 37 is keyed to the hub portion 36. The worm wheel 34 meshes with a worm member 38 which has a splined connection with a driving shaft 39. The driving shaft 39 is rotated in any suitable manner in order to effect rotation of the hob spindle 1 in timed relation to the rotation of the work carrying table. Moreover, the hob spindle 1 must rotate in timed relation to the movement of the carriage 5 which is effected by the screw shaft 6. For a more complete description of the connections between the hob spindle, the work carrying spindle and the screw shaft for effecting the feeding movement, reference may be had to my copending application Serial No. 4,207 filed January 23rd, 1925.

The stanchion 7 is provided with two rectangular shaped guide members 45 and 46 which engage and guide the carriage 5. The guide member 45 is provided with four surfaces 47, 48, 49 and 50. The last three of the aforesaid surfaces engage the carriage 5 and the surface 47 engages a strap 51, which is secured to the carriage 5 by means of bolts 52. A wedge member 53 is interposed between the strap 51 and the surface 47 in order to insure a snug sliding fit between the surface 47 and the strap and between the surface 49 and the carriage. The surfaces 47 and 49 are formed parallel to each other. An adjusting bolt 54 is threadably connected to the strap 51 and is provided with a collar 55 which engages a slot formed in the wedge member 53. Thus, by rotating the bolt 54 an adjustment of the wedge member 53 may be effected. A locking nut 56 is secured to the bolt 54 for holding the bolt and the wedge member in any adjusted position. A soft metal plug 57 is forced into engagement with the bolt 54 by means of a bolt 58 to assist in holding the bolt 54 in an adjusted position.

A wedge member 65 is provided between the surface 50 of the guide 45 and the carriage 5. Such wedge member 65 serves to insure a snug fit between the two surfaces 48 and 50 on the guide 45 and the carriage 5. The position of the wedge member 65 is adjusted by means of a bolt 66 which is similar in construction and operation to the bolt 54 which is associated with the wedge member 53. The surfaces 48 and 50 are formed parallel to each other and preferably at right angles to the surfaces 47 and 49 in order to form a rectangular guide. The two wedge members 53 and 65 insure a snug sliding fit between the four surfaces on the guide 45 and the carriage and strap. The wedge members are easily and efficiently adjusted at any time by means of the two adjusting bolts 54 and 66.

The guide 46 is provided with four guiding surfaces 68, 69, 70 and 71. The surfaces 68 and 71 are formed parallel to each other and the surfaces 69 and 70 are formed parallel to each other. Preferably the surfaces 68, 69 and the surfaces 70 and 71 are formed at right angles to each other in order to form a rectangular guide. A strap 72, which is secured to the carriage 5 by means of bolts 73, is provided for engaging the surface 70 on the guide. A wedge member 74, which is similar in construction to the wedge member 53, is provided for insuring a snug sliding fit with the surface 70 on the guide. A bolt 75, which is similar in construction and operation to the bolt 54, is provided for adjusting the position of the wedge member 74. A wedge member 76, which is similar in construction and operation to the wedge member 65 is provided for insuring a snug sliding fit between the surfaces 68 and 71 on the guide and the carriage 5. The wedge member 76 is operated by means of a bolt 77 which is similar in construction and operation to the adjusting bolt 66. A metal plug 79 composed of some soft metal such as copper or brass is forced into engagement with the bolt 75 by means of a bolt 80. The plug 79 and the bolt 80 assist in holding the bolt 75 in an adjusted position. A metal plug 81 and a bolt 82 are provided for holding the bolt 77 in an adjusted position.

In the above construction it will be noted the guides 45 and 46 are each provided with four surfaces for guiding the movement of the carriage 5. The carriage 5 is moved in a vertical direction by the screw shaft 6 and accordingly the guide members serve particularly for guiding purposes and do not support the weight of the carriage. Each of the guides has four surfaces for engaging either the carriage or a strap which is attached to the carriage. The providing of two rectangular guides, as above set forth, insures against any twisting of the carriage during the hobbing operation and moreover the twisting tendency which the carriage naturally is subjected to is distributed over two independent guides and not limited to one guide as in some machines heretofore constructed. The two wedging members associated with each guide serve to insure a snug sliding fit with all surfaces of each guide.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:—

1. A machine combining two parallel T-rails; an E-shaped carriage interfitting directly against four of the guide-ways of said two T-rails and having four slide-ways in spaced opposition to the remaining four guide-ways of said two T-rails; and four adjustable bearing-blocks intervening between said spaced guide-ways, the four guide-ways of each T-rail being successively at right angles to form a rectangular contour.

2. A machine-tool combining a stanchion providing twin rail-walls each presenting four flat guide-ways arranged in two right-angled pairs; a carriage bearing directly against the front guide-way of each rail-wall; two adjustable bearing strips independently operative against the respective rear guide-ways of said rail-walls; said carriage having a portion extended between said rail-walls and bearing directly against an internal side guide-way of the one rail-wall and directly against an external side guide-way of the other rail-wall; and adjustable bearing strips intervening between said carriage and the two remaining side guide-ways of said rail-walls.

3. A machine tool combining a frame providing two spaced rail-walls, each rail-wall presenting two pairs of parallel guide-ways; a carriage having a portion extended between said rail-walls and having a guide-way in direct contact with the inner guide-way of one of said rail-walls; an adjustable bearing strip between the inner guide-way of said other rail-wall and the adjacent portion of said carriage; said carriage also having its body-portion interfitted directly against two of the external guide-ways of the last-mentioned rail-wall and against one of the external guide-ways of the other rail-wall; and adjustable bearing-strips intervening between each of the remaining guide-ways and the body-portion of said carriage.

In witness whereof, I have hereunto subscribed my name.

WILLIAM F. ZIMMERMANN.